United States Patent
Sawada

(10) Patent No.: US 8,922,137 B2
(45) Date of Patent: Dec. 30, 2014

(54) DIMMING CONTROL DEVICE, DIMMING CONTROL METHOD AND LIGHTING APPARATUS PROVIDED WITH DIMMING CONTROL DEVICE

(75) Inventor: Akinobu Sawada, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 289 days.

(21) Appl. No.: 13/499,750

(22) PCT Filed: Aug. 10, 2010

(86) PCT No.: PCT/JP2010/063519
§ 371 (c)(1),
(2), (4) Date: Apr. 2, 2012

(87) PCT Pub. No.: WO2011/040124
PCT Pub. Date: Apr. 7, 2011

(65) Prior Publication Data
US 2012/0200225 A1    Aug. 9, 2012

(30) Foreign Application Priority Data
Oct. 2, 2009  (JP) .................. 2009-230057

(51) Int. Cl.
H05B 37/02  (2006.01)
H05B 33/08  (2006.01)

(52) U.S. Cl.
CPC ............. H05B 37/0218 (2013.01); *Y02B 20/46* (2013.01); H05B 33/0848 (2013.01); H05B 33/0854 (2013.01)
USPC ............................ 315/308; 315/151; 315/360

(58) Field of Classification Search
CPC ........ H05B 10/06; H05B 41/38; H05B 37/02; H05B 41/16; H04B 10/06
USPC ......... 315/149–159, 247, 291, 294, 297, 307, 315/308, 312, 360
See application file for complete search history.

(56) References Cited

U.S. PATENT DOCUMENTS

| | | | | |
|---|---|---|---|---|
| 5,498,931 | A  * | 3/1996  | Bedocs ......................... | 315/158 |
| 8,324,840 | B2 * | 12/2012 | Shteynberg et al. .......... | 315/308 |
| 2002/0140379 | A1* | 10/2002 | Chevalier et al. ............. | 315/291 |
| 2009/0033243 | A1* | 2/2009  | Gater ............................ | 315/291 |
| 2009/0079357 | A1* | 3/2009  | Shteynberg et al. .......... | 315/291 |
| 2010/0039581 | A1* | 2/2010  | Mishima et al. ............... | 349/61 |

FOREIGN PATENT DOCUMENTS

| | | |
|---|---|---|
| JP | 11-214179 | 8/1999 |
| JP | 2003-163089 | 6/2003 |
| JP | 2004-228051 | 8/2004 |
| JP | 2004-233569 | 8/2004 |
| JP | 2008-262860 | 10/2008 |

OTHER PUBLICATIONS

International Search Report for PCT/JP2010/063519 dated Nov. 22, 2010.

* cited by examiner

*Primary Examiner* — Tung X Le
(74) *Attorney, Agent, or Firm* — Fish & Richardson P.C.

(57) ABSTRACT

A lighting apparatus includes an illuminance sensor, a dimming control device and a light source. The lighting apparatus calculates a light output characteristic of the light source based on an illuminance measurement value when the light source is turned off and an illuminance measurement value when the light source is lit with a predetermined output, and calculates an ambient illuminance based on the light output characteristic. The illuminance measurement by the illuminance sensor is performed every predetermined period, and dimming control is performed on the light source based on the calculated ambient illuminance.

15 Claims, 7 Drawing Sheets

| LLUMINANCE INFORMATION Es | PWM CONVERSION RATE Sc |
|---|---|
| 0~50 LUX | 2. 0 TIMES |
| 50~200 LUX | 1. 5 TIMES |
| 200~500 LUX | 1. 0 TIMES |
| 500~1000 LUX | 0. 5 TIMES |
| 1000~ LUX | 0. 0 TIMES |

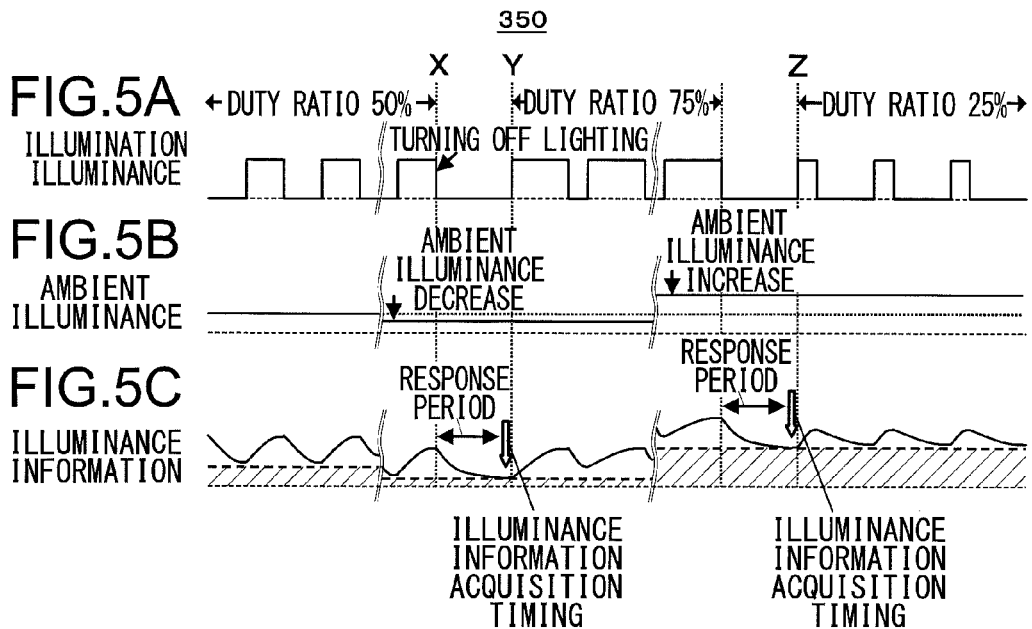
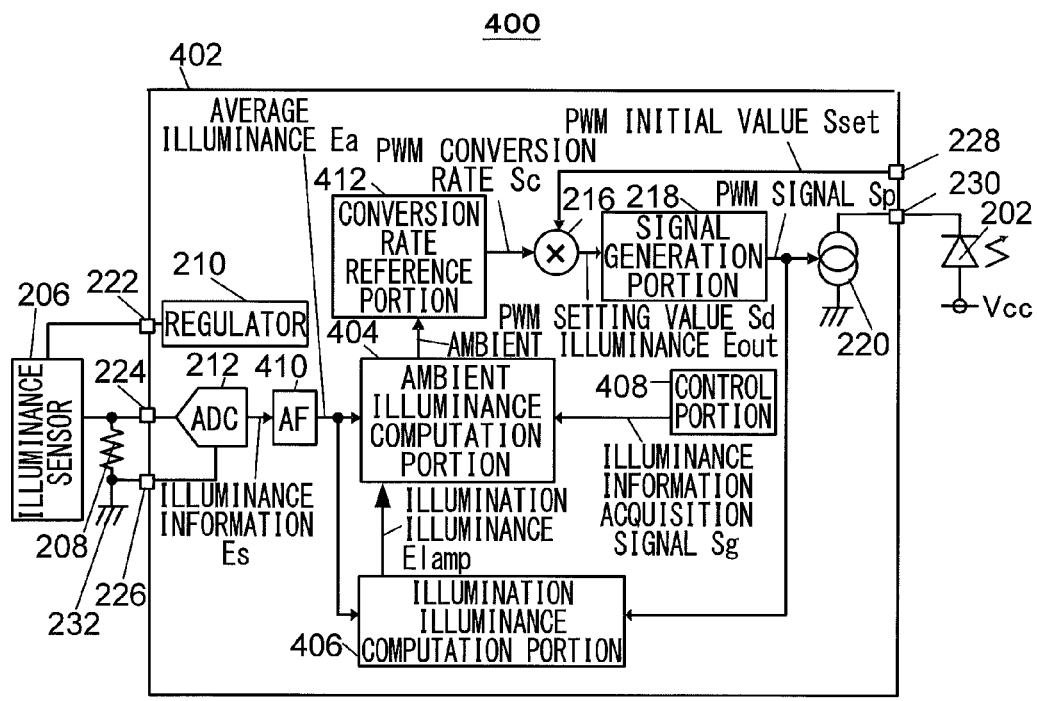

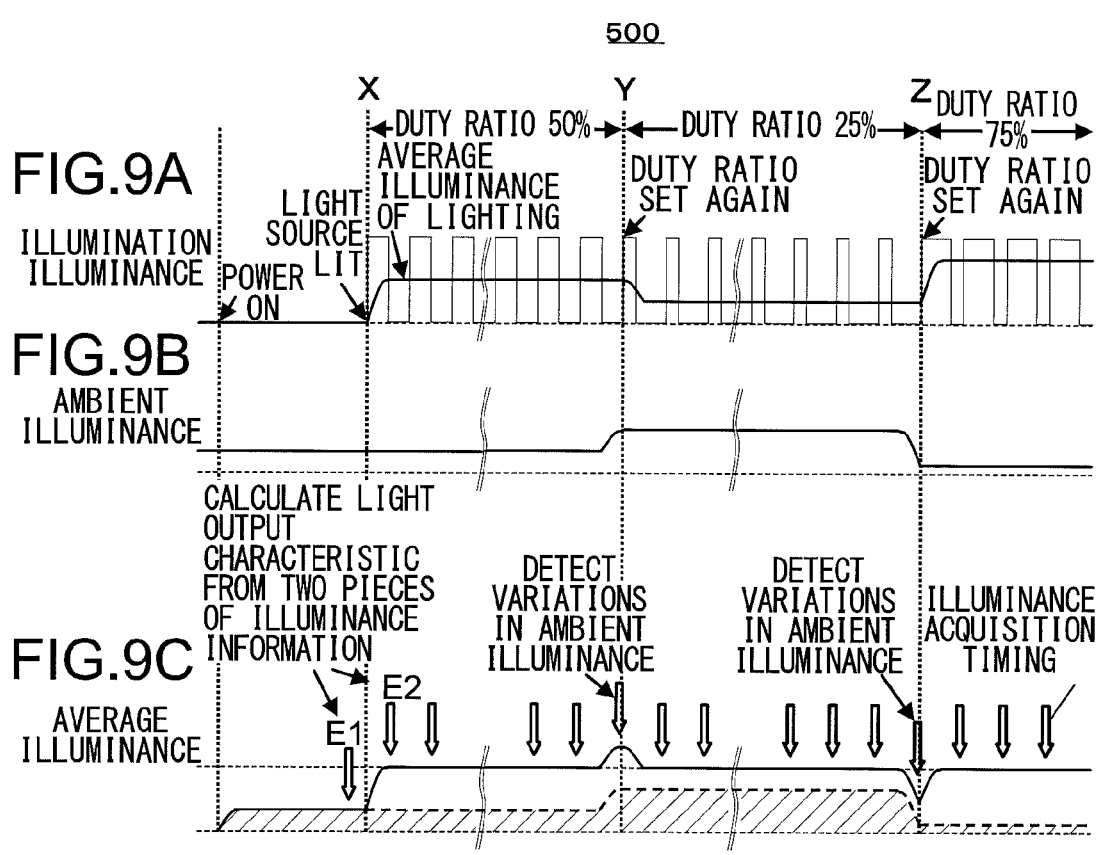

DIMMING CONTROL DEVICE, DIMMING CONTROL METHOD AND LIGHTING APPARATUS PROVIDED WITH DIMMING CONTROL DEVICE

TECHNICAL FIELD

The present invention relates to a dimming control device, a dimming control method and a lighting apparatus incorporating such a dimming control device.

BACKGROUND ART

A lighting apparatus incorporating an illuminance sensor and a dimming control device is conventionally well known in which an illuminance around the lighting apparatus is measured and in which the dimming control device varies the output of the lighting apparatus according to the measured illuminance.

However, it is known that, in the lighting apparatus described above, light (hereinafter also referred to as illumination light) emitted by the lighting apparatus enters the illuminance sensor, thus the dimming control device erroneously recognizes that an ambient illuminance varies and the lighting disadvantageously causes an unexpected blinking operation (so-called self-blinking problem).

In order to overcome the above problem, it is necessary for the illuminance sensor to measure only the ambient illuminance that does not include an illumination illuminance. Preferably, in order for the problem to be overcome, the distance between the lighting apparatus and the illuminance sensor is increased or a cover is attached to the illuminance sensor, and thus the illumination light is prevented from entering the illuminance sensor; however, this causes the structure of the lighting apparatus to be complicated, and also causes problems in terms of the size reduction and the cost reduction.

Patent document 1 and patent document 2 disclose a technical idea in which, in a lighting apparatus that lights an LED (light emitting diode) with intermittent pulses, an ambient illuminance is measured in a light-off period during which the LED is off. In the lighting apparatus disclosed in patent document 1 and patent document 2, when an illuminance sensor having a sufficient response speed is used, it is possible to measure only the ambient illuminance while the lighting apparatus is kept substantially in an on state. The output of the lighting apparatus is varied based on the measured ambient illuminance, and thus it is possible to prevent the occurrence of the self-blinking problem.

Patent document 3 discloses a technical idea in which the output of a lighting apparatus is varied, and an ambient illuminance is calculated from measurement values of an illuminance sensor when two different outputs are produced.

RELATED ART DOCUMENT

Patent Document

Patent document 1: JP-A-2003-163089
Patent document 2: JP-A-2004-233569
Patent document 3: JP-A-H11-214179

DISCLOSURE OF THE INVENTION

Problems to be Solved by the Invention

Although patent document 1 and patent document 2 disclose the technical idea in which, in the LED lighting that is lit with intermittent pulses, the ambient illuminance is measured in the light-off period during which the LED is off, the light-off period of the LED lighting is set at a period of, for example, 20 ms or less so that the eyes of a person do not sense flickering. Hence, an illuminance sensor is required that can perform the measurement at a response speed equal to or higher than it.

If the light-off period of the LED is made lower by PWM (pulse width modulation) control or the like than the response period of the illuminance sensor, it is impossible to measure the ambient illuminance.

Although patent document 3 discloses the technical idea in which the output of the lighting apparatus is varied, and the ambient illuminance is calculated from the measurement values of the illuminance sensor when two different outputs are produced, the calculated ambient illuminance is used only for gain adjustment on the illuminance sensor. Patent document 3 does not disclose a specific method of successively varying the output of the lighting apparatus based on the ambient illuminance.

The present invention is made to overcome the above problems; an object of the present invention is to provide a dimming control device that accurately acquires only an ambient illuminance even if the illumination light of a light source itself is varied, and that varies the output of the light source according to the ambient illuminance, and is also to provide a lighting apparatus incorporating such a dimming control device.

In the present specification, "illumination light" refers to light emitted by a light source connected to a dimming control device, and an "illumination illuminance" refers to the illuminance of the "illumination light." Unless a particular description is given, reflective light produced by the reflection of light emitted by the light source off a wall surface or the like is also included in the "illumination light."

In the present specification, "external light" refers to light other than illumination light in a space where an illuminance sensor is arranged, and an "ambient illuminance" refers to the illuminance of the "external light."

In the present specification, a "dimming control function" refers to the function of adjusting the brightness of the "light source" according to the "ambient illuminance"

Means for Solving the Problem

According to the present invention, there is provided a dimming control device to which an illuminance sensor and a light source are connected and which performs dimming control on the light source, in which the dimming control device performs intermittent pulse lighting control on the light source so as to repeat a lighting period and a light-off period, acquires, in the light-off period, illuminance information on an ambient illuminance of external light from the illuminance sensor and performs the dimming control on the light source based on the ambient illuminance and the light-off period when the illuminance information is acquired is determined based on a response period of the illuminance sensor.

Since the dimming control device configured as described above acquires the ambient illuminance and the illuminance information in the light-off period of the light source, it is possible to perform the dimming control on the light source based on the illuminance information on only the ambient illuminance excluding the illumination illuminance.

Furthermore, since the light-off period of the light source when the illuminance information is acquired from the illuminance sensor is determined based on the response period of the illuminance sensor, it is possible to accurately acquire the ambient illuminance even if an illuminance sensor having a slow response time is used.

According to another aspect of the present invention, there is provided a dimming control device to which an illuminance sensor and a light source are connected and which performs dimming control on the light source, in which the dimming control device determines a light output characteristic of the light source based on illuminance information from the illuminance sensor when the light source is turned off and the illuminance information when the light source is lit with a predetermined output, determines an ambient illuminance of external light based on the light output characteristic and the illuminance information and performs the dimming control on the light source based on the ambient illuminance.

According to another aspect of the present invention, there is provided a dimming control device to which an illuminance sensor and a light source are connected and which performs dimming control on the light source, in which the dimming control device determines a light output characteristic of the light source based on illuminance information from the illuminance sensor when the light source is lit with a first output and the illuminance information when the light source is lit with a second output different from the first output, determines an ambient illuminance of external light based on the light output characteristic and the illuminance information and performs the dimming control on the light source based on the ambient illuminance.

In the dimming control device configured as described above, since, even when the output of the light source is varied, the light output characteristic of the light source is determined and thus it is possible to accurately calculate the illumination illuminance, even if the illuminance information acquired from the illuminance sensor is illuminance information obtained by adding the ambient illuminance of the external light and the illumination illuminance of the light source, it is possible to determine, by calculation, only the ambient illuminance of the external light. In this way, with the ambient illuminance, it is possible to perform the dimming control on the light source.

Advantages of the Invention

The dimming control device of the present invention includes means of acquiring only the ambient illuminance of the external light, it is possible to perform the dimming control on the light source based on the ambient illuminance. Therefore, the occurrence of the self-blinking problem caused by the entrance of the illumination light into the illuminance sensor is prevented, and it is possible to provide the illuminance sensor and the light source such that they are adjacent to each other.

BRIEF DESCRIPTION OF DRAWINGS

FIG. 3 An example of a conversion rate table in the present invention;

FIG. 5 A diagram showing the timing of acquisition of illuminance information on the dimming control device according to the first embodiment of the present invention;

FIG. 6 A functional block diagram showing a dimming control device and a lighting apparatus according to a second embodiment of the present invention;

FIG. 9 A diagram showing the timing of acquisition of illuminance information on the dimming control device according to the second embodiment of the present invention.

MODE FOR CARRYING OUT THE INVENTION

Figure 1:
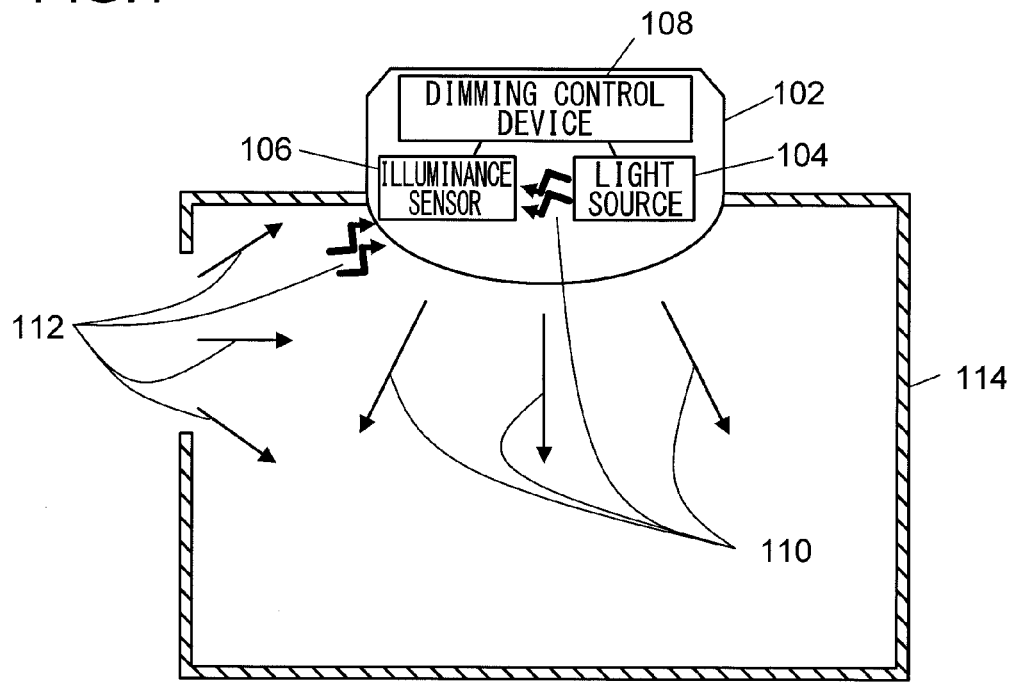
FIG. 1 A schematic diagram of a dimming control device of the present invention.

FIG. 1 shows a schematic diagram of the present invention common to all embodiments in the present specification. A lighting apparatus 102 is attached to the ceiling of a room, and includes a light source 104, an illuminance sensor 106 and a dimming control device 108. A portion represented by reference numeral 114 schematically shows a wall surface of the room. Arrows represented by reference numeral 110 and arrows represented by reference numeral 112 schematically show illumination light from the light source 104 and external light such as solar light, respectively.

The dimming control device 108 acquires illuminance information from the illuminance sensor 106, and performs dimming control on the light source 104 based on the illuminance information.

The light source 104 and the illuminance sensor 106 are provided adjacent to each other; when the light source 104 is lit, the illuminance sensor 106 measures an illuminance obtained by adding the illumination illuminance of the illumination light 110 to the ambient illuminance of the external light 112.

First Embodiment

A dimming control device according to the first embodiment and a lighting apparatus incorporating such a dimming control device will be described with reference to FIGS. 2 to 5.

Figure 2:
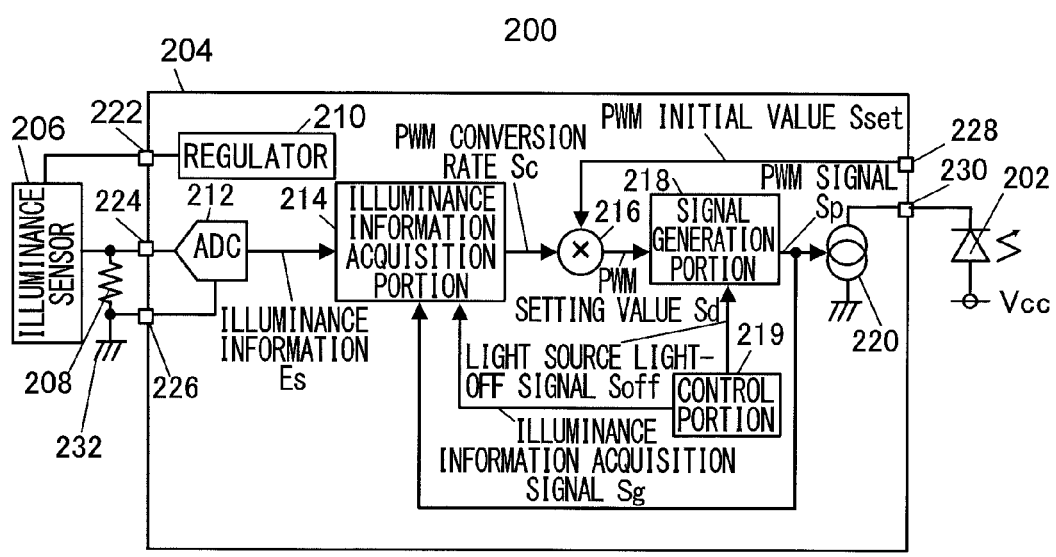
FIG. 2 A functional block diagram showing the dimming control device and a lighting apparatus according to a first embodiment of the present invention.

FIG. 2 is a functional block diagram of the lighting apparatus according to the first embodiment. The lighting apparatus 200 includes a light source 202, a dimming control device 204 and an illuminance sensor 206. The light source 202, the dimming control device 204 and the illuminance sensor 206 respectively correspond to the light source 104, the dimming control device 108 and the illuminance sensor 106 shown in FIG. 1.

The dimming control device 204 includes a regulator 210, an AD converter 212, an illuminance information acquisition portion 214, a multiplication portion 216, a signal generation portion 218, a control portion 219, a light source lighting current source 220, a sensor power supply terminal 222, an illuminance input first terminal 224, an illuminance input second terminal 226, an initial setting terminal 228 and a light source connection terminal 230.

The illuminance sensor 206 is connected to the sensor power supply terminal 222 and the illuminance input first terminal 224 of the dimming control device 204. As the illuminance sensor 206, for example, a photodiode, a phototransistor, a photo IC or the like can be utilized. A conversion resistor 208 for converting the output current of the illuminance sensor 206 into voltage is connected between the illuminance input first terminal 224 and the illuminance input second terminal 226. Furthermore, the sensor connection second terminal 226 is connected to a reference potential 232.

The light source 202 is connected to the light source connection terminal 230. In the first embodiment, as the light source 202, an element having a high response speed such as an LED is preferably used.

A PWM initial value Sset is input to the initial setting terminal 228. The PWM initial value Sset is a signal that indicates the initial duty ratio of a PWM signal Sp used in the lighting control on the light source 202. The duty ratio of the PWM signal Sp is a value that is obtained by multiplying the PWM initial value Sset by a PWM conversion rate Sc, which will be described later.

The regulator 210 is connected to the sensor power supply terminal 222, and inputs a constant voltage to the illuminance sensor 206. A voltage value input by the regulator 210 to the illuminance sensor 206 and the resistance value of the conversion resistor 208 are preferably set as appropriate according to the properties of the illuminance sensor 206.

The AD converter 212 is connected to the illuminance input first terminal 224 and the illuminance input second terminal 226, receives the illuminance measurement value of the illuminance sensor 206 as an analog signal and outputs illuminance information Es that is a signal obtained by converting the analogue signal into a digital signal.

At the same time when the power supply of the lighting apparatus 200 is turned on, the control portion 219 transmits an illuminance information acquisition signal Sg that instructs the illuminance information acquisition portion 214 to acquire the illuminance information Es, and thereafter transmits the illuminance information acquisition signal Sg to the illuminance information acquisition portion 214 and a light source light-off signal Soff to the signal generation portion 218 every predetermined period. The light source light-off signal Soff is a signal for setting, when the illuminance information acquisition portion 214 acquires the illuminance information Es, the off period of the PWM signal Sp according to the response period of the illuminance sensor 206.

The illuminance information acquisition portion 214 acquires the illuminance information Es based on the reception of the illuminance information acquisition signal Sg, and outputs a PWM conversion rate Sc based on a conversion rate table 250, which will be described later. The illuminance information acquisition portion 214 monitors the PWM signal Sp; in order for illuminance information on only the ambient illuminance excluding the illumination light to be obtained, the acquisition of the illuminance information Es is performed during the light-off period of the PWM signal Sp and at the time when the illuminance information Es is stable. The timing of acquisition of the illuminance information Es will be described later.

An example of the conversion rate table 250 is shown in FIG. 3. The illuminance information acquisition portion 214 determines, according to the value of the illuminance information Es measured by the illuminance sensor 206, the PWM conversion rate Sc by which the PWM initial value Sset is multiplied. For example, when the value of the illuminance information Es indicates 0 to 50 lux, the PWM conversion rate Sc is 2.0 times; when value of the illuminance information Es indicates 1000 lux or more, the PWM conversion rate Sc is 0.0 times. The conversion rate table is not limited to the example shown in FIG. 3; many variations of the conversion rate table are possible. For example, when the conversion rate table 250 is set such that, as the value of the illuminance information Es is increased, the PWM conversion rate Sc is increased, it is possible to increase the duty ratio of the light source 202 as the ambient illuminance is increased. The same is true for the other embodiments in the present specification.

With reference back to FIG. 2, the multiplication portion 216 receives the PWM conversion rate Sc and the PWM initial value Sset, and outputs a PWM setting value Sd that is a value obtained by multiplying the PWM conversion rate Sc and the PWM initial value Sset.

The signal generation portion 218 receives the PWM setting value Sd, and outputs the PWM signal Sp that is a rectangular signal for lighting the light source 202. The PWM signal Sp has a duty ratio given by the PWM setting value Sd. The on-duty and the off-duty of the PWM signal Sp are determined based on a duty ratio given by the previously set frequency (for example, 400 Hz) of the PWM signal Sp and the PWM setting value Sd. For example, when the setting is made such that the frequency of the PWM signal Sp is 400 Hz and the duty ratio of the PWM setting value Sd is 80%, the on-duty of the PWM signal Sp is set at 2.0 ms, and the off-duty of the PWM signal Sp is set at 0.5 ms. When the signal generation portion 218 receives the light source light-off signal Soff from the control portion 219, the signal generation portion 218 sets the subsequent off-duty of the PWM signal Sp according to the respond period of the illuminance sensor 206.

Based on the PWM signal Sp, the light source lighting current source 220 performs intermittent pulse lighting control on the light source 202. Specifically, while the PWM signal Sp is high, a current is fed to the light source 202, and thus lighting control is performed on the light source 202 whereas, while the PWM signal Sp is low, the feeding of the current is stopped, and thus light-off control is performed on the light source 202. Naturally, the relationship between the potential of the PWM signal Sp and the lighting control and the light-off control on the light source 202 may be reversed; it is also possible to perform the lighting control on the light source 202 while the PWM signal Sp is low, and the light-off control on the light source 202 while the PWM signal Sp is high.

Figure 4:
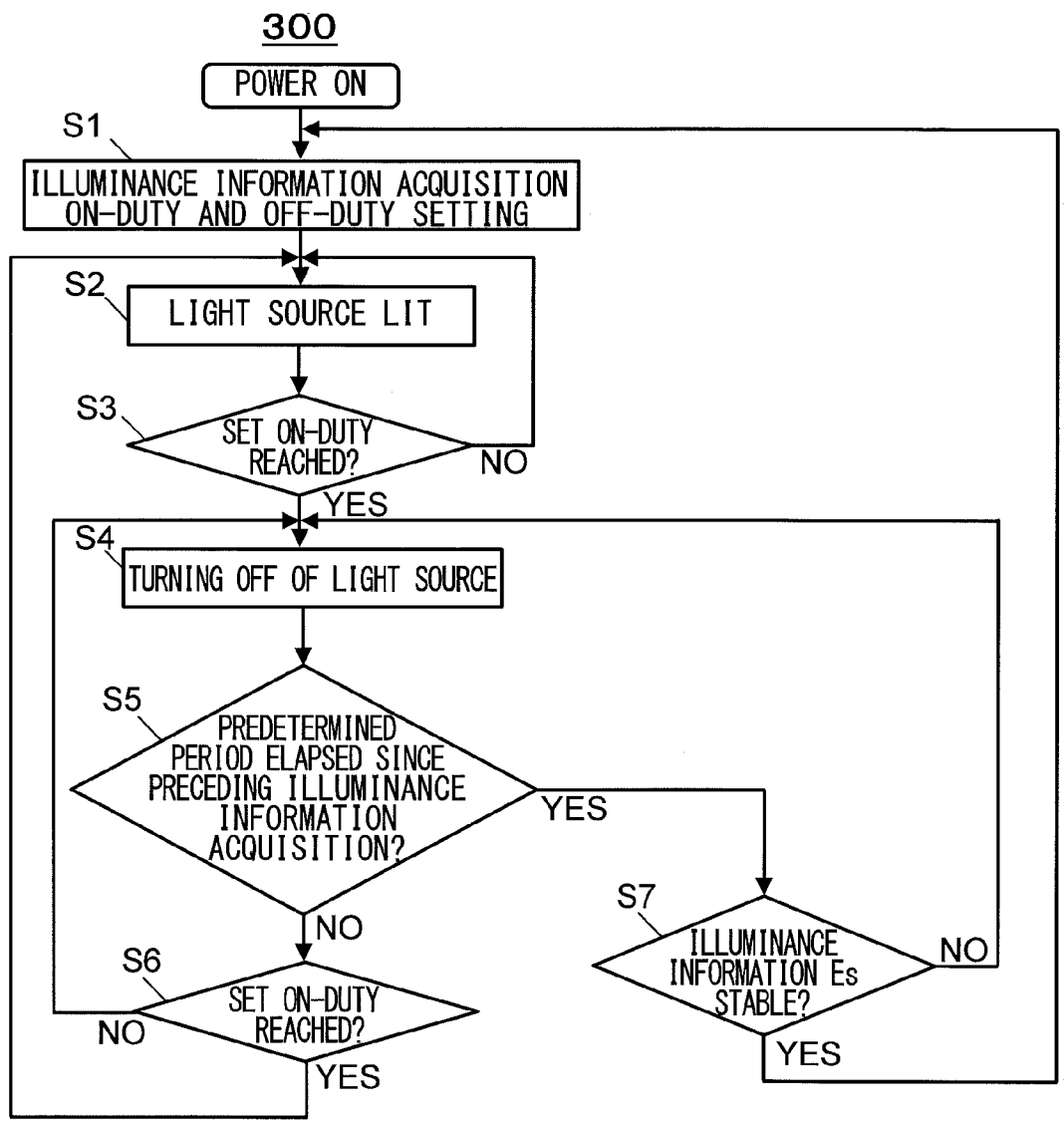
FIG. 4 A flowchart showing the operations of the dimming control device and the lighting apparatus according to the first embodiment of the present invention.

FIG. 4 is a flowchart of the dimming control function of the lighting apparatus 200 according to the first embodiment. When the power supply of the lighting apparatus 200 is turned on, processing is stated from step S1.

In step S1, the illuminance information acquisition portion 214 acquires, based on the illuminance information acquisition signal Sg from the control portion 219, the illuminance information Es that is the illuminance measurement value of the illuminance sensor 206. The processing described previously is performed in the illuminance information acquisition portion 214, the multiplication portion 216 and the signal generation portion 218; the on-duty and the off-duty of the light source 202 are set based on the illuminance information Es and the PWM initial value Sset.

In step S2, the lighting control is performed on the light source 202. In step S3, whether or not the on-duty in which the lighting period of the light source 202 is set is reached is determined. If the on-duty in which the lighting period of the light source 202 is set is not reached, the on-duty is determined not to be reached (no), and the process returns to step S2, where the lighting of the light source 202 is continued whereas, if the on-duty in which the lighting period of the light source 202 is set is reached, the on-duty is determined to be reached (yes), and the process moves to step S4.

In step S4, the light-off control is performed on the light source 202. In step S5, whether or not a predetermined period has elapsed since the preceding illuminance measurement is determined. If the predetermined period has not elapsed since the preceding illuminance measurement, the predetermined period is determined not to have elapsed since the preceding illuminance measurement (no), and the process moves to step S6 whereas, if the predetermined period has elapsed since the preceding illuminance measurement, the predetermined period is determined to have elapsed since the preceding illuminance measurement (yes), and the process moves to step S7. The predetermined period can be set at, for example, about one second.

In step S6, whether or not the light-off period of the light source 202 reaches the set off-duty is determined. If the light-off period of the light source 202 reaches the set off-duty, the light-off period of the light source 202 is determined to reach the set off-duty (yes), and the process returns to step S2, where the lighting control on the light source 202 is performed whereas, if the light-off period of the light source 202 does not reach the set off-duty, the light-off period of the light source 202 is determined not to reach the set off-duty (no), and the process returns to step S4, where the light-off control on the light source 202 is continued.

In step S7, whether or not the illuminance information Es is stable is determined. With respect to the determination of whether or not the illuminance information Es is stable, for example, it is possible to perform the determination by checking whether or not a difference between illuminance information Es at a certain time A and illuminance information Es' at time B that is a minute time Δt (for example, 0.05 ms) behind time A falls within a predetermined range. Alternatively, the response period of the illuminance sensor 206 is previously input to the dimming control device 204, and the stability of the illuminance information Es may be determined by checking whether or not the response period has elapsed since the start of the light-off control on the light source 202.

In step S7, the illuminance information Es is determined to be stable (yes), the process moves to step S1, where the on-duty and the off-duty are set again.

In step S7, the illuminance information Es is determined not to be stable (no), the process moves to step S4, where the light-off control on the light source 202 is continued.

FIG. 5 is a diagram showing the timing of acquisition of illuminance information on the lighting apparatus 200 according to the first embodiment. In (a), variations in the illumination illuminance that is the illuminance of light emitted by the light source 202 are shown; in (b), variations in the ambient illuminance that is the illuminance of the external light are shown; in (c), the illuminance information Es that is the illuminance measurement value of the illuminance sensor 206 is shown.

If it is now assumed that the illuminance information acquisition portion 214 receives the illuminance information acquisition signal Sg at time X, the illuminance information acquisition portion 214 recognizes that the PWM signal Sp is in an off period, and stats to determine whether or not the illuminance information Es is stable. If the illuminance information Es is determined not to be stable, the light-off control on the light source 202 is continued, and, at a time (after the response period of the illuminance sensor 206 has elapsed) when the illuminance information Es becomes stable, the acquisition of the illuminance information Es is performed by the illuminance information acquisition portion 214. The determination of whether or not the illuminance information Es is stable is the same as described above. The value of the illuminance information Es acquired here is the value of the ambient illuminance of the external light.

The illuminance information acquisition portion 214 outputs, based on the conversion rate table 250, the PWM conversion rate Sc corresponding to the illuminance information Es; the multiplication portion 216 multiplies the PWM initial value Sset and the PWM conversion rate Sc, and outputs the PWM setting value Sd.

In order for the signal generation portion 218 to output the PWM signal Sp based on the PWM setting value Sd, the PWM duty ratio of the light source 202 is updated according to the acquisition of the illuminance information Es by the illuminance information acquisition portion 214.

When the light-off control is performed on the light source 202 at time X, the illuminance information Es is not immediately reduced to the value of the ambient illuminance, and the value of the ambient illuminance is indicated at a time that is only the response period of the illuminance sensor 206 behind and when the illuminance information Es becomes stable. At the timing described above, the illuminance information is acquired. At time Y, the PWM conversion rate Sc is set again based on the ambient illuminance measured by the illuminance sensor 206, and the PWM setting value Sd is varied. Specifically, as the ambient illuminance is decreased, the PWM duty ratio of the light source 202 is increased from 50% to 75%. Since, at time Z, the ambient illuminance measured by the illuminance sensor 206 is increased as compared with the preceding measurement, the PWM conversion rate Sc is set again, and the PWM setting value Sd is varied. Specifically, the PWM duty ratio of the light source 202 is decreased form 75% to 25%. In FIG. 5(c), a shaded portion is the value of the ambient illuminance.

The first embodiment has been described above with reference to FIGS. 2 to 5. In the configuration described above, since the ambient illuminance is measured using the light-off period of the PWM signal Sp that is a drive signal of the light source 202, it is possible to measure the ambient illuminance while the illumination illuminance of the light source 202 is little affected.

Since the light-off period of the PWM signal Sp when the ambient illuminance is measured by the illuminance sensor 206 is extended according to the response period of the illuminance sensor 206, even if an illuminance sensor having a long response period is used, it is possible to accurately measure the ambient illuminance. Furthermore, since the dimming control on the light source 202 is performed based on the ambient illuminance excluding the illumination illuminance, the self-blinking problem resulting from the dimming control on the light source 202 is prevented from occurring.

Since, in the lighting apparatus 200 according to the first embodiment, the intermittent pulse lighting of the light source 202 does not cause the eyes of a person to sense flickering, it is preferably performed at a frequency of 50 Hz or more.

In the lighting apparatus 200 according to the first embodiment, the measurement of the ambient illuminance may be performed continuously a plurality of times. The average value of the values obtained by continuously measuring the ambient illuminance a plurality of times can also be employed.

Second Embodiment

A dimming control device according to the second embodiment and a lighting apparatus incorporating such a dimming control device will be described with reference to FIGS. 6 to 9.

FIG. 6 is a functional block diagram of the lighting apparatus according to the second embodiment. The same parts as in FIG. 2 are identified with the same symbols, and their description will not be repeated. The lighting apparatus 400 includes the light source 202, a dimming control device 402 and the illuminance sensor 206. The light source 202, the dimming control device 402 and the illuminance sensor 206 respectively correspond to the light source 104, the dimming control device 108 and the illuminance sensor 106 shown in FIG. 1.

The dimming control device 402 includes the regulator 210, the AD converter 212, an average filter 410, an ambient illuminance computation portion 404, an illumination illuminance computation portion 406, a control portion 408, a conversion rate reference portion 412, the multiplication portion 216, the signal generation portion 218, the light source lighting current source 220, the sensor power supply terminal 222, the illuminance input first terminal 224, the illuminance input second terminal 226, the initial setting terminal 228 and the light source connection terminal 230.

The lighting apparatus 400 greatly differs from the lighting apparatus 200 shown in FIG. 2 in that the lighting apparatus 400 includes the ambient illuminance computation portion 404 and the illumination illuminance computation portion 406.

The average filter 410 outputs, as an average illuminance Ea, the average value of the illuminance information Es input during a predetermined period (for example, 10 ms).

When the power supply of the lighting apparatus 400 is turned on, before the lighting of the light source 202, the average illuminance Ea that is the average value of the illuminance information Es is read by the illumination illuminance computation portion 406. Thereafter, the intermittent pulse lighting control is performed on the light source 202, and the average illuminance Ea is read again by the illumination illuminance computation portion 406. The illumination illuminance computation portion 406 calculates the light output characteristic of the light source 202 from these two average illuminances Ea.

The light output characteristic is a characteristic that shows the relationship between the PWM duty ratio and the illumination illuminance when the intermittent pulse lighting is performed on the light source 202. In general, when the intermittent pulse lighting control is performed on an LED, since a proportional relationship between the PWM duty ratio and the illumination illuminance holds true, the rate of variation in the illumination illuminance with respect to the PWM duty ratio is the light output characteristic of the light source 202.

Figure 7:
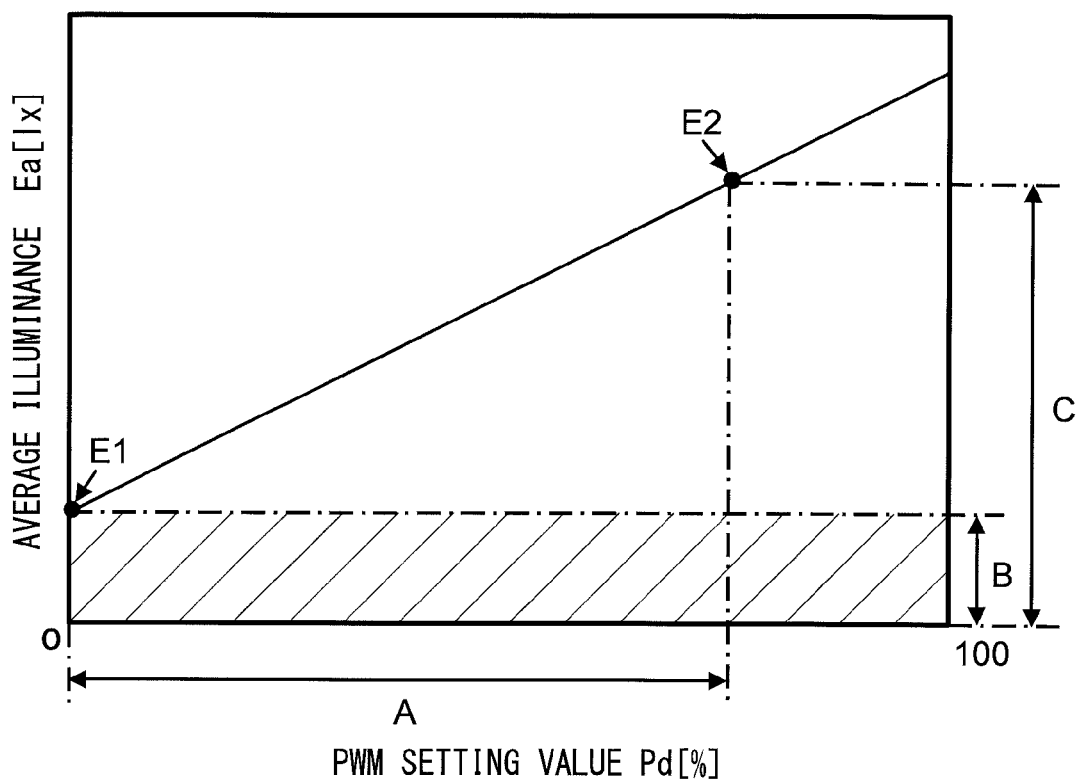
FIG. 7 A diagram illustrating a method of calculating a light output characteristic of the dimming control device according to the second embodiment of the present invention.

A method of calculating the light output characteristic of the light source 202 will be described with reference to FIG. 7. FIG. 7 shows variations in the average illuminance Ea when the ambient illuminance is assumed to be constant and the PWM setting value Sd is varied.

When the power supply of the lighting apparatus is turned on, the illumination illuminance computation portion 406 acquires, before the lighting of the light source 202, an ambient illuminance B as the average illuminance Ea (at a measurement point E1). Then, after the lighting of the light source, an illuminance C corresponding to (ambient illuminance+illumination illuminance) is acquired (at a measurement point E2).

The illumination illuminance computation portion 406 calculates, from the ambient illuminance B, the illuminance C and a PWM setting value A at the time of acquisition of the illuminance C, the variation rate D of the illumination illuminance with respect to a PWM setting value Pd and stores it. The variation rate D is calculated according to the following formula.

Variation rate $D=$(Illuminance $C-$Ambient illuminance $B$)/PWM setting value $A$    [Formula 1]

The illumination illuminance computation portion 406 calculates the variation rate D, and then calculates an illumination illuminance Elamp from the PWM duty ratio of the PWM signal Sp, and outputs it to the ambient illuminance computation portion 404. The illumination illuminance Elamp is calculated according to the following formula.

Illumination illuminance $E$lamp$=$Current PWM duty ratio$\times$Variation rate $D$    [Formula 2]

The ambient illuminance computation portion 404 acquires the illumination illuminance Elamp from the illumination illuminance computation portion 406, and calculates an ambient illuminance Eout from the illumination illuminance Elamp and the average illuminance Ea, and outputs it. The ambient illuminance Eout is calculated according to the following formula. The acquisition of the illumination illuminance Elamp and the average illuminance Ea by the ambient illuminance computation portion 404 is performed every predetermined period (for example, one second)

Ambient illuminance $E$out$=$Average illuminance $E$a$-$Illumination illuminance $E$lamp    [Formula 3]

The conversion rate reference portion 412 acquires the ambient illuminance Eout, and outputs the PWM conversion rate Sc based on the conversion rate table. An example of the conversion rate table has been shown in FIG. 3.

The multiplication portion 216 acquires the PWM conversion rate information Sc and the PWM initial value Sset, and outputs the PWM setting value Sd obtained by multiplying them together.

The signal generation portion 218 receives the PWM setting value Sd, and outputs the PWM signal Sp for lighting the light source 202. The PWM signal Sp is a rectangular pulse signal having a duty ratio given by the PWM setting value Sd.

The light source lighting current source 220 performs the intermittent pulse lighting control on the light source 202 based on the PWM signal Sp.

The PWM signal Sp is also input to the illumination illuminance computation portion 406, and the illumination illuminance computation portion 406 calculates the current duty ratio from the PWM signal Sp.

Although, in the second embodiment, the calculation of the variation rate D is performed based on the illuminance information when the light source 202 is turned off and the illuminance information when the light source 202 is lit with a predetermined output, the light output characteristic of the light source 202 can also be determined based on illuminance information when the light source 202 is lit with a first output and illuminance information when the light source 202 is lit with a second output different from the first output. When it is assumed that a PWM setting value when the light source 202 is lit with the first output is A1, that an illuminance input to the illumination illuminance computation portion 406 at that time is E1, that a PWM setting value when the light source 202 is lit with the second output is A2 and that an illuminance input to the illumination illuminance computation portion 406 at that time is E2, the variation rate D can be determined from the following formula.

Variation rate $D=$(Illuminance $E1-$Illuminance $E2$)/(PWM setting value $A1-$PWM setting value $A2$)    [Formula 4]

Figure 8:
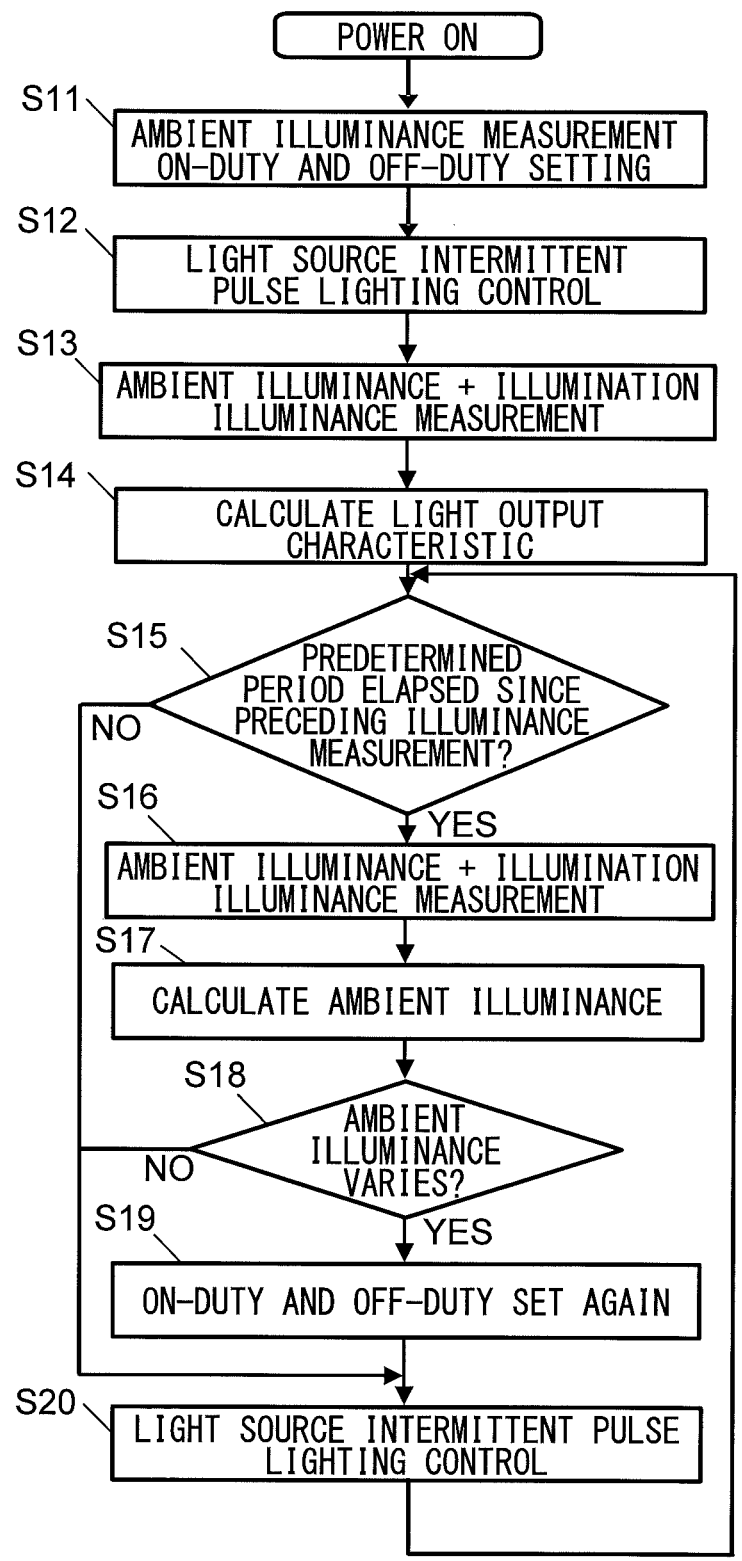
FIG. 8 A flowchart showing the operations of the dimming control device and the lighting apparatus according to the second embodiment of the present invention.

FIG. 8 is a flowchart of the dimming control function of the lighting apparatus 400 according to the second embodiment. When the power supply of the lighting apparatus 400 is turned on, processing is stated from step S11.

In step S11, before the lighting of the light source 202, the illumination illuminance computation portion 406 acquires and stores the average illuminance Ea of the illuminance sensor 206. The illuminance value acquired here is the value of the ambient illuminance B shown in FIG. 7. The value of the ambient illuminance B is input as the ambient illuminance Eout to the conversion rate reference portion 412, the processing described previously is performed in the conversion rate reference portion 412, the multiplication portion 216 and the signal generation portion 218, the on-duty and the off-duty of the light source 202 are set and the process moves to step S12.

In step S12, the intermittent pulse lighting control is performed on the light source 202, and then, in step S13, the acquisition of (ambient illuminance+illumination illuminance) is performed. The illuminance value acquired here is the value of the illuminance C shown in FIG. 7.

In step S14, the light output characteristic of the light source 202 is calculated. The calculation of the light output characteristic is the same as described previously.

In step S15, whether or not a predetermined period has elapsed since the preceding illuminance measurement is determined. If the predetermined period has not elapsed since the preceding illuminance measurement, the predetermined period is determined not to have elapsed since the preceding illuminance measurement (no), and the process moves to step S20 where the intermittent pulse lighting control on the light source 202 is continued without the current on-duty and off-duty being varied. If the predetermined period has elapsed since the preceding illuminance measurement, the predetermined period is determined to have elapsed since the preceding illuminance measurement (yes), and the process moves to step S16.

In step S16, the acquisition of the average illuminance Ea by the ambient illuminance computation portion 404 is performed. The average illuminance Ea acquired here is a value obtained by adding the ambient illuminance of the external light and the illumination illuminance of the light source 202.

In step S17, the calculation of the ambient illuminance by the ambient illuminance computation portion 404 is performed. The calculation of the ambient illuminance is the same as described previously.

In step S18, whether or not the ambient illuminance has varied is determined. If the ambient illuminance has not varied since the preceding acquisition of the average illuminance Ea, the ambient illuminance is determined not to have varied since the preceding acquisition of the average illuminance Ea (no), and the process moves to step S20 where the intermittent pulse lighting control on the light source 202 is continued without the current on-duty and off-duty being varied. If the ambient illuminance has varied, the ambient illuminance is determined to have varied (yes), and the process moves to step S19.

In step S19, based on the variation in the ambient illuminance, the on-duty and the off-duty are set again. Specifically, the conversion rate reference portion 412 inputs, based on the ambient illuminance Eout, a new PWM conversion rate Sc to the multiplication portion 216, and thus the on-duty and the off-duty are set again.

In step S20, based on the on-duty and the off-duty that have been set, the intermittent pulse lighting control on the light source 202 is performed.

FIG. 9 is a diagram showing the timing of acquisition of illuminance information on the lighting apparatus 400 according to the second embodiment. In (a), variations in the illumination illuminance that is the illuminance of light emitted by the light source 202 are shown; in (b), variations in the ambient illuminance that is the illuminance of the external light are shown; in (c), variations in the average illuminance Ea that is input to the ambient illuminance computation portion 404 or the illumination illuminance computation portion 406 are shown.

As shown at the measurement point E1 in FIG. 9(c), when the power supply of the lighting apparatus 400 is turned on, the ambient illuminance is measured before the light source 202 is lit. Based on the ambient illuminance, the on-duty and the off-duty of the light source 202 are set, and the intermittent pulse lighting control on the light source 202 is performed.

After the intermittent pulse lighting control on the light source 202 is performed, the value of the average illuminance Ea is input to the illumination illuminance computation portion 406 at the timing shown at the measurement point E2 in FIG. 9(c). Based on the illuminance measurement values at the measurement point E1 and the measurement point E2, the illumination illuminance computation portion 406 calculates the light output characteristic of the light source 202.

Thereafter, the ambient illuminance computation portion 404 acquires the value of the average illuminance Ea every predetermined period. The ambient illuminance computation portion 404 inputs the ambient illuminance Eout to the conversion rate reference portion based on the values of the average illuminance Ea and the illumination illuminance Elamp, and updates the PWM setting value Sd.

At time Y, the average illuminance Ea is increased as the ambient illuminance is increased, the PWM conversion rate Sc is set again and the PWM setting value Sd is varied. Specifically, based on the conversion rate table 250 shown in FIG. 3, the PWM conversion rate Sc is set again, and thus the PWM duty ratio of the light source 202 is decreased from 50% to 25%. At time Z, the PWM conversion rate Sc is set again based on the decrease in the ambient illuminance, and the PWM setting value Sd is varied. Specifically, the PWM duty ratio is increased form 25% to 75%. The acquisition of the average illuminance Ea by the ambient illuminance computation portion 404 is performed every predetermined period, and the lighting control is performed on the light source 202 using the PWM duty ratio corresponding to the variation in the ambient illuminance. In FIG. 5(c), the shaded portion is the value of the ambient illuminance.

The second embodiment has been described above with reference to FIGS. 6 to 9. In this configuration, even if the output of the light source 202 is varied, the light output characteristic of the light source 202 is calculated, and thus it is possible to accurately calculate the ambient illuminance. Since the dimming control on the light source 202 is performed based on the ambient illuminance, the self-blinking problem resulting from the dimming control on the light source 202 is prevented from occurring.

Although, in the second embodiment, the calculation of the light output characteristic is performed each time the power supply of the lighting apparatus 400 is turned on, the calculation of the light output characteristic does not necessarily need to be performed each time the power supply is turned on. Based on an instruction from a user, the calculation of the light output characteristic may be performed or the calculation of the light output characteristic may be performed every predetermined period (for example, one week). If no consideration is given to the deterioration of the lighting apparatus 400 and variations in the light output characteristic caused by the change of the installation environment, the calculation of the light output characteristic may be performed only when the lighting apparatus 400 is installed. However, if the power supply of the lighting apparatus 400 is turned on, and thereafter the light output characteristic is likely to be changed by variations in the temperature of the light source 202, it is preferable to perform the calculation of the light output characteristic every predetermined period (for example, one minute).

Although, in the second embodiment, the dimming control is performed on the light source 202 by the PWM control, the method of performed the dimming control on the light source 202 is not limited to the PWM control. For example, by varying the current fed to the light source 202, the dimming control may be performed on the light source 202. When the PWM control is performed, as the light source 202, an element having a high response speed such as an LED is preferably used.

Although, in the second embodiment, a proportional relationship between the illumination illuminance of the light source 202 and the PWM setting value Sd holds true, even if there is no proportional relationship between the illumination illuminance and the PWM setting value Sd, as long as the light output characteristic of the light source 202 can be determined from illuminance information on two different PWM setting values Sd, the present invention can be practiced. For example, even when the illumination illuminance is exponentially increased with respect to the PWM setting value Sd, the present invention can be practiced.

In the first embodiment or the second embodiment, a switch is provided in the regulator 210, and thus a constant voltage may be applied to the illuminance sensor 206 only when the illuminance is measured. With this configuration, it is possible to reduce the power consumption of the lighting apparatus.

In the first embodiment or the second embodiment, when the PWM setting value Sd is varied, the signal generation portion 218 may reflect it on the duty ratio of the PWM signal Sp or may gradually vary the duty ratio of the PWM signal Sp over a predetermined period.

Although, in the first embodiment or the second embodiment, the dimming control on the light source 202 is started at the same time the power supply of the lighting apparatus is turned on, the timing of the start of the dimming control on the light source 20 is not limited to the time when the power supply of the lighting apparatus is turned on, and many variations are possible. For example, the dimming control on the light source 202 may be performed based on an instruction from the user or may be stated at a preset time. The dimming control can be started a predetermined period after the power supply of the lighting apparatus is turned on. In this case, the duty ratio of the light source 202 when the dimming control is not performed is preferably set based on the PWM initial value Sset.

Although, in the first embodiment or the second embodiment, the dimming control on the light source 202 is performed by the PWM control, the dimming control on the light source 202 can be performed by PFM control.

When the lighting apparatus described in the first embodiment or the second embodiment is used, even if a cover is not attached to the illuminance sensor, the light source and the illuminance sensor can be placed adjacent to each other; the light source and the illuminance sensor do not necessarily need to be placed adjacent to each other, and they may be placed a predetermined distance apart.

INDUSTRIAL APPLICABILITY

As described above, since, in the lighting apparatus of the present invention, it is possible to measure or calculate the ambient illuminance even if the light source and the illuminance sensor are placed adjacent to each other, it is possible to perform the dimming control on the light source based on the ambient illuminance. Hence, the occurrence of the self-blinking problem in the light source is prevented, and the lighting apparatus of the present invention is greatly applicable in industry.

LIST OF REFERENCE SYMBOLS 102, 200, 400 lighting apparatus
104, 202 light source
106, 206 illuminance sensor
108, 204, 402 dimming control device
110 illumination light
112 external light
114 wall surface
208 conversion resistor
210 regulator
212 AD converter
214 illuminance information acquisition portion
216 multiplication portion
218 signal generation portion
219, 408 control portion
220 light source lighting current source
222 sensor power supply terminal
224 illuminance input first terminal
226 illuminance input second terminal
228 initial setting terminal
230 light source connection terminal
232 reference potential
250 conversion rate table
300 flowchart of the first embodiment
350 timing chart of the first embodiment
450 flowchart of the second embodiment
500 timing chart of the second embodiment
404 ambient illuminance computation portion
406 illumination illuminance computation portion
410 average filter
412 conversion rate reference portion

The invention claimed is:

1. A dimming control device to which an illuminance sensor and a light source are connected and which performs dimming control and lighting control on the light source, the dimming control device comprising:
   an average filter that outputs, as an average illuminance, an average value of illuminance information acquired in the illuminance sensor during a predetermined period;
   an illumination illuminance computation portion that determines an illumination illuminance
   an ambient illuminance computation portion that determines an ambient illuminance;
   a conversion rate reference portion that acquires the ambient illuminance, and that outputs a PWM (pulse width modulation) conversion rate based on a conversion rate table;
   a multiplication portion that acquires the PWM conversion rate and a PWM initial value, and that outputs a PWM setting value obtained by multiplying the PWM conversion rate and the PWM initial value;

a signal generation portion that receives the PWM setting value, and that outputs a PWM signal for lighting the light source; and a light source lighting current source that performs intermittent pulse lighting control on the light source based on the PWM signal, wherein the illumination illuminance computation portion acquires a first average illuminance output from the average filter before the dimming control device lights the light source and a second average illuminance output from the average filter when the dimming control device lights the light source with a predetermined output, divides a differential illuminance obtained by subtracting the first average illuminance from the second average illuminance by a PWM setting value at a time of the acquisition of the second average illuminance so as to calcualte a variation rate of the illumination illuminance with respect to the PWM setting value and multiplies a current PWM duty ratio of the PWM signal by the variation rate so as to calculate the illumination illuminance, and wherein the ambient illuminance computation portion acquires the illumination illuminance from the illumination illuminance computation portion, and subtracts the illumination illuminance from the average illuminance so as to calculate the ambient illuminance.

2. The dimming control device of claim 1, wherein the illumination illuminance computation portion:

acquires a third average illuminance output from the average filter when the dimming control device lights the light source with a first output and a fourth average illuminance output from the average filter when the dimming control device lights the light source with a second output different from the first output, and divides a differential illuminance obtained by subtracting the fourth average illuminance from the third average illuminance by a differential setting value obtained by subtracting a PWM setting value at a time of the acquisition of the fourth average illuminance from a PWM setting value at a time of the acquisition of the third average illuminance so as to calcualte a variation rate of the illumination illuminance with respect to the PWM setting value.

3. The dimming control device of claim 2, wherein the dimming control device determines the light output characteristic when a power supply of the dimming control device is turned on.

4. The dimming control device of claim 1, wherein the dimming control device determines the light output characteristic when a power supply of the dimming control device is turned on.

5. The dimming control device of claim 1, wherein the dimming control device determines the light output characteristic based on an instruction from a user.

6. The dimming control device of claim 1, wherein the dimming control device increases an illuminance of the light source when the ambient illuminance is lower than a predetermined illuminance whereas the dimming control device decreases the illuminance of the light source when the ambient illuminance is higher than the predetermined illuminance.

7. The dimming control device of claim 1, wherein the dimming control device increases an illuminance of the light source when the ambient illuminance is higher than a predetermined illuminance whereas the dimming control device decreases the illuminance of the light source when the ambient illuminance is lower than the predetermined illuminance.

8. A lighting apparatus comprising: the dimming control device of claim 1;
the illuminance sensor connected to the dimming control device; and
the light source connected to the dimming control device.

9. The lighting apparatus of claim 8, wherein the light source is an LED.

10. The lighting apparatus of claim 8, wherein a voltage is applied to the illuminance sensor only when the illuminance is measured.

11. The dimming control device of claim 1, further comprising an initial setting terminal to which the PWM initial value is input.

12. The dimming control device of claim 1, further comprising a regulator that applies a constant voltage to the illuminance sensor.

13. The dimming control device of claim 12, wherein the regulator includes a switch for applying the constant voltage to the illuminance sensor only when the illuminance is measured.

14. The dimming control device of claim 1, further comprising an AD converter that receives an illuminance measurement value of the illuminance sensor as an analog signal and that outputs the illuminance information that is a signal obtained by converting the analog signal into a digital signal.

15. The dimming control device of claim 1, wherein the signal generation portion varies the duty ratio of the PWM signal when PWM setting value is varied.

* * * * *